United States Patent
Hilsebecher et al.

(10) Patent No.: US 9,557,412 B2
(45) Date of Patent: Jan. 31, 2017

(54) ANGULAR RESOLUTION RADAR SENSOR

(75) Inventors: Joerg Hilsebecher, Hildesheim (DE); Wolf Steffens, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 1931 days.

(21) Appl. No.: 12/227,845

(22) PCT Filed: Jun. 13, 2007

(86) PCT No.: PCT/EP2007/055838
§ 371 (c)(1),
(2), (4) Date: Aug. 14, 2009

(87) PCT Pub. No.: WO2008/006656
PCT Pub. Date: Jan. 17, 2008

(65) Prior Publication Data
US 2009/0303108 A1 Dec. 10, 2009

(30) Foreign Application Priority Data
Jul. 13, 2006 (DE) .................. 10 2006 032 540

(51) Int. Cl.
*G01S 13/34* (2006.01)
*G01S 7/35* (2006.01)
*G01S 13/93* (2006.01)

(52) U.S. Cl.
CPC .............. *G01S 13/345* (2013.01); *G01S 7/352* (2013.01); *G01S 13/931* (2013.01); *G01S 2007/356* (2013.01); *G01S 2013/9321* (2013.01); *G01S 2013/9325* (2013.01)

(58) Field of Classification Search
USPC ....................................... 342/147
See application file for complete search history.

(56) References Cited

U.S. PATENT DOCUMENTS

| 6,037,894 | A | * | 3/2000 | Pfizenmaier et al. | .......... 342/70 |
| 6,856,280 | B1 | | 2/2005 | Eder et al. | |
| 7,109,916 | B2 | | 9/2006 | Klinnert et al. | |
| 7,548,186 | B2 | * | 6/2009 | Mende et al. | ................ 342/149 |

(Continued)

FOREIGN PATENT DOCUMENTS

| DE | 10355796 | 6/2005 |
| EP | 1380854 | 1/2004 |

(Continued)

OTHER PUBLICATIONS

International Search Report, PCT International Patent Application No. PCT/EP2007/055838, dated Sep. 13, 2007.

*Primary Examiner* — Matthew M Barker
(74) *Attorney, Agent, or Firm* — Norton Rose Fulbright US LLP; Gerard Messina

(57) ABSTRACT

A radar sensor having multiple antenna elements for transmitting and receiving radar signals, an associated transmitting and receiving element and an evaluation device for determining the azimuth angle of located objects on the basis of a relationship between the signals received from different antenna elements, wherein the transmitting and receiving element is designed to supply to the antenna elements transmission signals in parallel, the frequencies of which are offset with respect to one another, and the evaluation device is designed to distinguish between signals that were transmitted by different antenna elements on the basis of the frequency offset.

9 Claims, 6 Drawing Sheets

(56) References Cited

U.S. PATENT DOCUMENTS

2002/0175859 A1  11/2002  Newberg et al.
2007/0241955 A1  10/2007  Brosche

FOREIGN PATENT DOCUMENTS

| GB | 2 408 645 | 6/2005 |
|---|---|---|
| JP | 4-313091 | 11/1992 |
| JP | 2005-527801 | 9/2005 |
| WO | WO 03/081278 | 10/2003 |
| WO | WO 2005/038488 | 4/2005 |
| WO | WO 2005/062071 | 7/2005 |

* cited by examiner

ANGULAR RESOLUTION RADAR SENSOR

FIELD OF THE INVENTION

The present invention relates to a radar sensor having multiple antenna elements for transmitting and receiving radar signals, an associated transmitting and receiving element and an evaluation device for determining the azimuth angle of located objects on the basis of a relationship between the signals received from different antenna elements.

BACKGROUND INFORMATION

Antenna elements may be individual antennas or patches, for example, which are offset with respect to the optical axis of a common radar lens. The directional characteristic of each antenna element, specifically the direction in the greatest radiation intensity or the greatest sensitivity, is then given by the offset of the respective element with respect to the optical axis. Alternatively, however, the antenna elements may be so-called phased arrays made up of multiple sub-elements, which are supplied with transmission signals having such a phase relationship that the desired directional characteristic results by interference. The same antenna elements or alternatively separate antenna elements may be used for transmitting and for receiving the radar signals.

Such radar sensors are used, for example, in so-called ACC systems (adaptive cruise control) for motor vehicles and serve the purpose of measuring the distances and relative speeds of preceding vehicles so as to allow for an adaptive distance and speed control. The determination of the azimuth angles of the located objects is then used to distinguish between preceding vehicles on the same lane as the host vehicle and vehicles on adjacent lanes.

As an example of such a radar sensor, European Patent Application No. EP 1 380 854 A2 describes a static FMCW multibeam radar. In this context, the term "static" signifies that the directions of the radar beams generated by the individual antenna elements are invariable over time such that the entire locating angle range of the angular resolution radar sensor may be monitored simultaneously by parallel evaluation of the signals supplied by the individual antenna elements.

In an FMCW radar (frequency modulated continuous wave), the frequency of the transmission signals supplied to the individual antenna elements is modulated in ramped-shaped fashion. The signal received from each individual antenna element is mixed with the transmission signal that is supplied to this antenna element. In this manner, an intermediate-frequency signal is obtained, the frequency of which indicates the frequency difference between the transmitted signal and the received signal. This frequency difference is a function of the relative speed of the located object on account of the Doppler effect, but is also a function of the signal propagation time and thus of the distance of the object due to the modulation of the transmitted signal.

The intermediate frequency signals are digitized and recorded over a time span approximately corresponding to one individual frequency ramp. The signal pattern thus obtained is then split up into its frequency spectrum by fast Fourier transform. In this spectrum, each located object emerges as one individual peak, the frequency position of which is a function of the distance and the relative speed of the respective object. If the transmitted signals are alternately modulated using frequency ramps having different ramp slopes, for example having a rising ramp and a falling ramp, then it is possible definitely to determine, for an individual object, the distance and the relative speed of the object from the position of the peaks in the spectrums obtained for the two ramps. If multiple objects are located simultaneously, then it is necessary for a definite allocation of the peaks to the respective objects to modulate the transmitted signals using at least one additional frequency ramp.

For each channel, i.e. for each antenna element, a spectrum is obtained on each frequency ramp, in which the located objects emerge in the form of a peak. For the peaks pertaining to an individual object, the amplitude and the phase of the intermediate frequency signal, for example at the apex of the peak, differ somewhat from channel to channel. The differences in the amplitude and phase, collectively also known as a complex amplitude, result from the different directional characteristics of the antenna elements and are a function of the azimuth angle of the respective object.

For each individual antenna element, the complex amplitude displays a characteristic dependence on the azimuth angle, which may be represented in an antenna diagram. The distance and the relative speed of the object enter into the complex amplitude only in the form of a phase factor, which is identical for all channels. By comparing the complex amplitudes in the different channels it is thus possible to determine the azimuth angle of the respective object. Stated in a simplified manner, the azimuth angle is sought at which the complex amplitudes measured respectively at the apex of the peak fit best with the associated antenna diagrams. In the radar sensor described in European Patent Application No. EP 1 380 854 A2, in order to improve the angular resolution, the complex amplitude is evaluated not only at the apex of the respective peak, but at multiple frequencies in proximity to this apex.

In the conventional radar sensor, the same frequency-modulated transmission signal is supplied to all antenna elements. As an example, let it be assumed that the same antenna elements are used for transmission and for reception. Each antenna element then receives a radar echo, not only from the signal that it had sent itself, but also from the signals sent by the other antenna elements. Provided they come from the same object, all these signals have the same frequency and are superposed on each other on the receiving antenna element to form a composite signal. Now, if, for example, two objects differ in their azimuth angle, but have the same distance and the same relative speed, then their signals can no longer be separated in the spectrum such that the radar sensor is unable to resolve the different azimuth angles of the two objects.

Another effect that impairs the angular resolution capacity of the known radar sensor results from the fact that the individual antenna elements do not generate sharply bundled beams, but rather relatively widely fanned radar lobes, due to diffraction and interference effects. Typically, two or more secondary lobes form in addition to a main lobe. These may arise in particular also by coupling with the signals of equal frequency transmitted by other antenna elements.

SUMMARY

An objective of the present invention is to create a radar sensor that has an improved angular resolution capacity while also having a simple construction.

According to an example embodiment of the present invention, this objective may be achieved in a radar sensor of the kind mentioned at the outset by the fact that the transmitting and receiving element is designed to supply the antenna elements with transmission signals in parallel whose frequencies are offset with respect to each other and that the evaluation device is designed to distinguish, on the basis of the frequency offset, between signals that were transmitted by different antenna elements.

Because of the frequency offset, the signals transmitted by the different antenna elements are decoupled from one another such that couplings between these signals are no longer able to contribute to the formation of secondary lobes.

Another substantial advantage is that on the basis of the frequency offset it is possible to distinguish within the signal received from a single antenna element between the portion of the signal that was transmitted by this antenna element itself and the portions of the signal transmitted by other antenna elements. Thus, for an individual radar object, for example, that is located in the overlapping region of two radar lobes, two peaks are now obtained in the spectrum of each of the two associated channels, one of which represents the direct echo, i.e., the signal that was transmitted by the respective antenna element and was also received by it again, while the other peak represents the so-called cross echo that was transmitted by the other antenna element. The frequency difference between these two peaks corresponds to the frequency offset between the transmitted signals. If, in the radar sensor according to the present invention, one evaluates the complex amplitudes only at the apex of each peak, for example, one consequently obtains altogether four complex amplitudes from the two antenna elements involved, in contrast with only two complex amplitudes in the case of the conventional sensor. A substantially higher number of measured values is thus available for determining the azimuth angle, which markedly improves the angular resolution capacity. In particular, even when evaluating the signals of only two radar lobes, it is now possible to resolve two angularly offset objects that have the same distance and the same relative speed.

Overall, an improvement of the angular resolution capacity may thus be achieved without having to increase the aperture and thus the dimensions of the sensor and without a noticeable increase in the complexity of the sensor construction. On the transmitter side, only additional devices for producing the frequency offset between the transmitted signals are needed, and on the receiving side a somewhat greater bandwidth is needed so that the spectrum may be evaluated in a frequency range that includes the frequencies transmitted by multiple antenna elements.

The radar sensor is preferably constructed as an FMCW radar. The fact that the transmitting frequency is increased in at least one antenna element then yields the following additional advantage: As was explained above, the position of the signal generated by a radar object in the frequency spectrum is a function of the relative speed of the object and may thus at certain relative speeds also be shifted into the so-called DC range of the spectrum, i.e., into the frequency range surrounding the frequency zero, or even into the range of negative frequencies. It is not possible to detect or evaluate signal portions in the DC range using conventional FMCW radar sensors. In the complex intermediate frequency signal $Z=|A|e^{ift}$, positive and negative frequencies differ by the operational sign of frequency f. However, since in the conventional FMCW method in the end only the absolute value of the real component of the intermediate frequency signal is evaluated, it is not possible to distinguish between positive and negative frequencies, so that the measuring result may be falsified if significant signal portions are in the negative spectral range. In the FMCW radar according to the present invention, the intermediate frequency signal for each channel is formed by mixing the signal received from the respective antenna element with a base signal, the frequency of which is at most equal to the smallest of the transmitting frequencies supplied to the different antenna elements. At least for one of the channels, the signal in the spectrum is therefore shifted by the frequency offset to positive frequencies such that the entire signal or at least a greater portion of it now lies in the positive frequency range capable of evaluation.

According to one specific embodiment of the radar sensor, the individual antenna elements (possibly with the exception of a first antenna element) are connected via respective frequency shifting stages to a common oscillator which generates the base frequency signal. This base frequency signal is then raised in the frequency shifting stages by the respectively desired frequency offset. The base frequency signal is at the same time supplied to the mixers which form the corresponding intermediate frequency signals from the signals received from the different antenna elements.

According to another specific embodiment, each antenna element has assigned to it its own oscillator for generating the transmission signal.

Because for improving the angular resolution it is sufficient that the transmission signals of all antenna elements are decoupled and that the cross echo is evaluated in each case for one of the antenna elements involved in this cross echo, a simplified cost-effective construction may be achieved in that for some channels, e.g., those that correspond to the outermost left and outermost right radar lobe, the intermediate frequency signal is formed as usual by mixing the received signal with the signal actually transmitted by the respective antenna element such that the frequency of the intermediate frequency signal is not raised. Although it is then not possible to detect cross echoes in these channels, the advantage is a simplified construction of the evaluation device. In particular, narrower-band and thus more cost-effective analog/digital converters may be used.

BRIEF DESCRIPTION OF THE DRAWINGS

Exemplary embodiments of the present invention are depicted in the figures and described in greater detail below.

DETAILED DESCRIPTION OF EXAMPLE EMBODIMENTS

Figure 1:
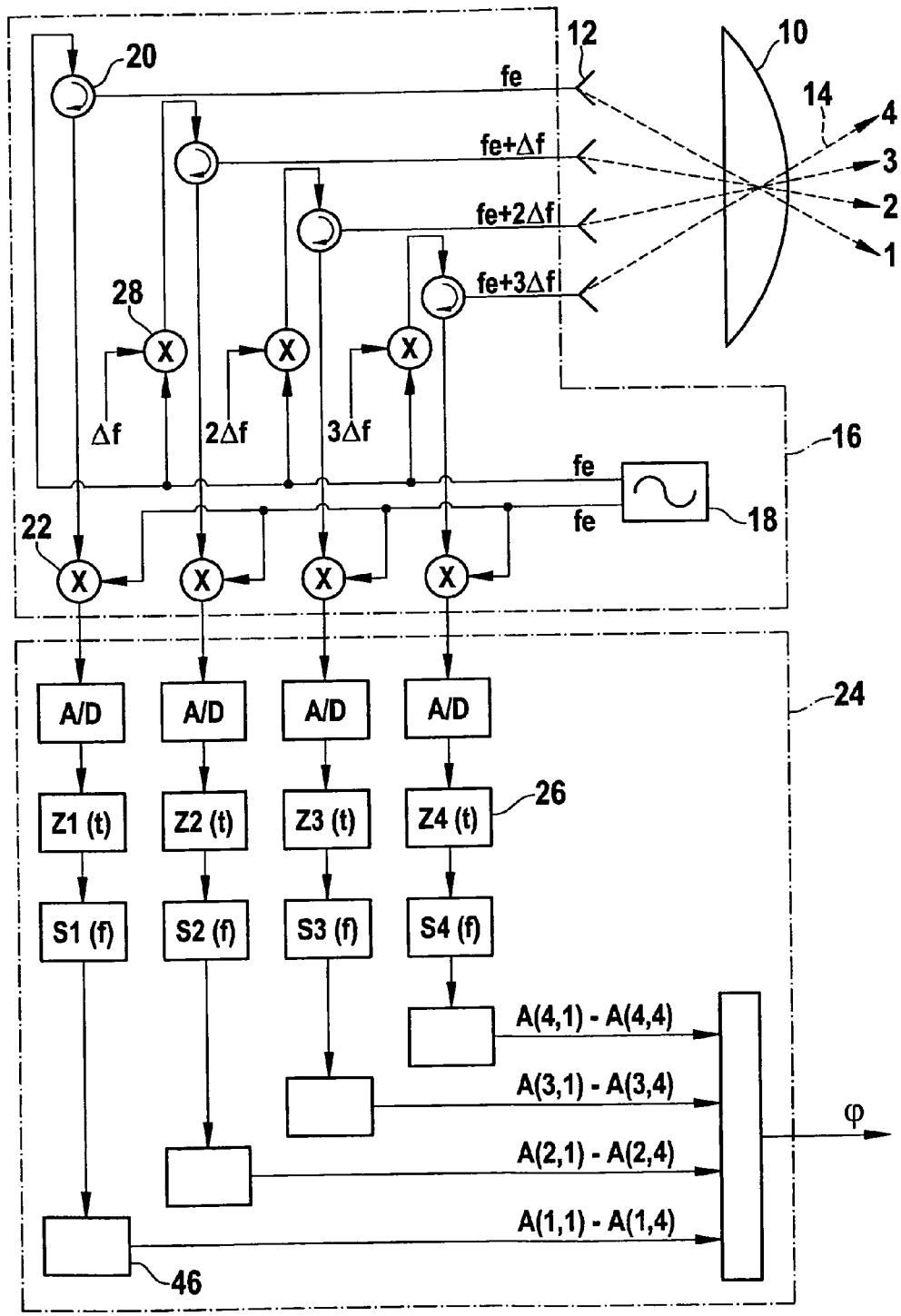
FIG. 1 shows a block diagram of a radar sensor according to a specific example embodiment of the present invention.

FIG. 1 shows the basic construction of an angular resolution FMCW radar sensor having a lens 10, in the focal plane of which four antenna elements 12, e.g., patch antennas, are situated at a varying offset with respect to the optical axis of lens 10. Antenna elements 12 thus produce radar beams 14, which are bundled by lens 10 and then emitted in different directions. Each antenna element 12 is part of one channel of the radar sensor. For differentiation, the channels are numbered consecutively by numerals 1-4 on the associated radar beams 14.

A transmitting and receiving element 16 has a local oscillator 18 (VCO; voltage controlled oscillator), which generates a microwave signal having a base frequency fe of 76 GHz for example. For channel 1, this base frequency signal is fed via a circulator 20 directly into associated antenna element 12. The signal received from this antenna element is separated from the fed-in signal by circulator 20 and is then mixed in a mixer 22 with the signal supplied by oscillator 18, which has the base frequency fe. Mixer 22 thus generates an intermediate frequency signal, the frequency of which corresponds to the frequency difference between the transmitted signal and the received signal in channel 1.

In an evaluation device 24, the intermediate frequency signal supplied by mixer 22 is digitized in an analog/digital converter A/D and is then recorded in a memory device 26 as a function of time $(Z1(t))$. From function $Z1(t)$, spectrum $S1(f)$ is calculated by fast Fourier transform, i.e., a function that indicates the complex amplitude (given by absolute value and phase) of the intermediate frequency signal as a function of frequency f.

Figure 2:
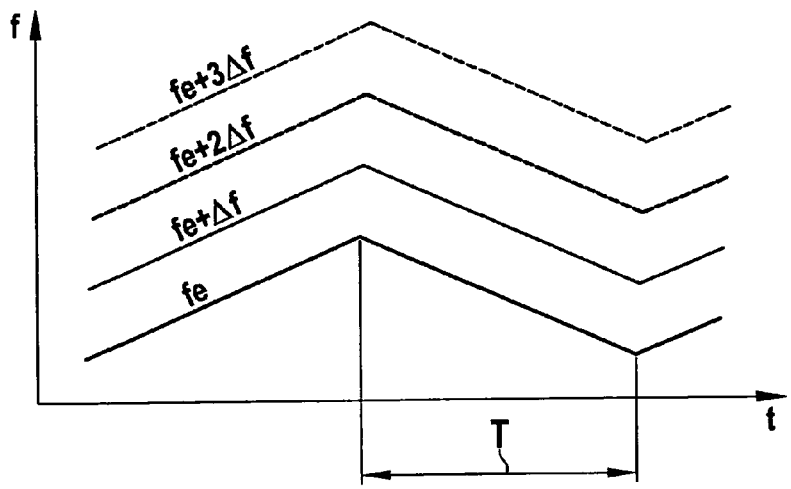
FIG. 2 shows a frequency/time diagram for transmission signals for different antenna elements.

Base frequency fe of the signal supplied by oscillator 18 is modulated in ramp-shaped fashion, as is shown in a simplified manner by the lower curve in FIG. 2. An individual rising or falling ramp has the duration T. This also corresponds to the time over which function $Z1(t)$ is recorded.

If the radar beam associated with channel 1 strikes an object and is reflected again to the radar sensor, then the reflected signal exhibits a frequency shift that is composed of a Doppler portion as a function of the relative speed of the object and a propagation time portion as a function of the distance. The propagation time portion is proportional with respect to the signal propagation time and to the rise of the frequency ramp. Spectrum $S1(f)$ of the intermediate frequency signal consequently has a maximum value or "peak" at the frequency that corresponds to this frequency shift. If one forms the sum of the frequency shifts obtained for the rising and the falling ramp in FIG. 2, then the propagation time-dependent portions cancel each other, and one obtains a measure for the relative speed of the object. If one forms the difference, by contrast, then the Doppler portions cancel each other and one obtains a measure for the distance of the object.

For channels 2, 3 and 4, transmitting and receiving element 16 in FIG. 1 has a slightly modified construction. Here, a frequency shifting stage 28, for example a mixer, is respectively connected between oscillator 18 and circulator 20. As a result, the base frequency fe in channel 2 is raised by a frequency offset $\Delta f$, in channel 3 by $2\Delta f$ and in channel 4 by $3\Delta f$. Frequency offset $\Delta f$ is 1 MHz for example. The frequencies transmitted by antenna elements 12 are accordingly offset with respect to one another by 1 MHz. The respective frequency curves are shown in FIG. 2 for all four antenna elements.

This frequency offset first has the consequence that the signals transmitted from the individual antenna elements 12 are decoupled from each other in terms of frequency such that the shape of the respective radar lobes is no longer influenced by interferences between the individual antenna elements 12. Otherwise, such interferences occur because the distance between the individual antenna elements 12 is approximately of the same order of magnitude as the wavelength $\lambda$ of the transmitted microwave signals. The distance between two neighboring antenna elements 12 is approximately $0.5\lambda$ for example.

Figure 3:
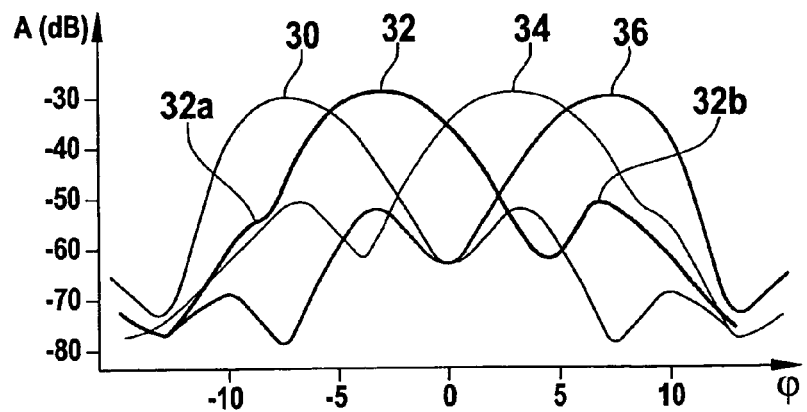
FIG. 3 shows antenna diagrams for a conventional radar sensor.

If, as in a conventional radar sensor of this kind, all antenna elements 12 were activated at the base frequency fe, then on account of the offset arrangement of the antenna elements and on account of the interference effects, one would obtain antenna diagrams of the form shown in a simplified manner in FIG. 3. Each of the curves 30, 32, 34 and 36 shown in FIG. 3 is associated with one of the four channels of the radar sensor and indicates the intensity of the respective radar beam as a function of the azimuth angle $\phi$, in which the radiation is emitted.

Accordingly, curves 30 through 36 also indicate the sensitivity of the respective antenna element for reflected radiation that is received from the direction corresponding to azimuth angle $\phi$.

Each curve is seen to have a relatively wide maximum. This means that the corresponding radar beams 14 have widened into radar lobes. The maximum in each case lies at a different angle that is given by the offset of the respective antenna element relative to the optical axis. As may be seen, for example, in curve 32 drawn in bold face, each radar lobe has secondary lobes 32a, 32b, which are caused by interference effects. These secondary lobes hampers the evaluation of the received signals in determining the azimuth angle of the located object.

Figure 4:
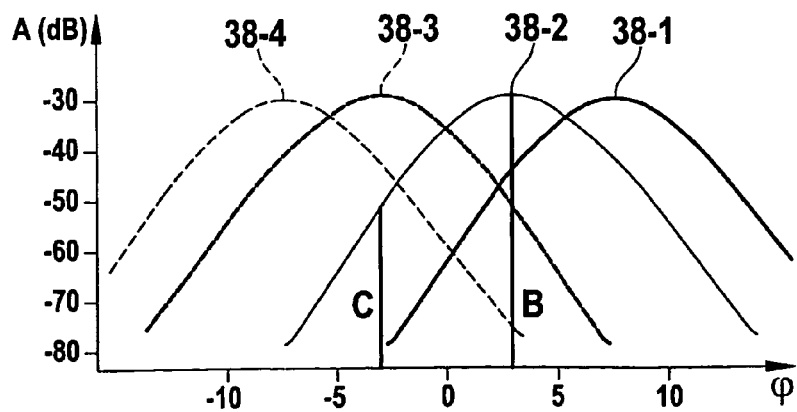
FIG. 4 shows antenna diagrams for the radar sensor according to the example embodiment of the present invention.

FIG. 4 schematically show the shape of the corresponding antenna diagrams for the radar sensor as shown in FIG. 1. Curves 38-1, 38-2, 38-3 and 38-4 in FIG. 4 correspond to channels 1-4 in FIG. 1. Due to the decoupling of the transmission frequencies, the secondary lobes caused by interference are here clearly suppressed.

As FIG. 1 shows, the signal supplied by oscillator 18 having base frequency fe is fed to mixers 22 in all four channels. The consequence is that the signals exhibit an additional frequency shift by $\Delta f$, $2\Delta f$ and $3\Delta f$ respectively in spectrums $S2(f)$-$S4(f)$. This allows for a more precise determination of the azimuth angle of a located object, as shall now be explained in more detail on the basis of FIGS. 5 through 8.

Figure 5:
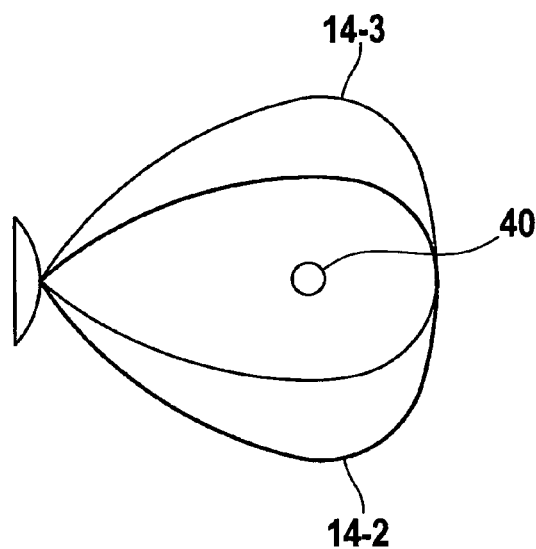
FIG. 5 shows a schematic representation of a single object in the overlapping region of two radar lobes.

FIG. 5 shows an object 40, which has azimuth angle $\phi=0$ and lies in the overlapping region of two radar lobes 14-2 and 14-3, which correspond to channels 2 and 3 in FIG. 1.

Figure 6:
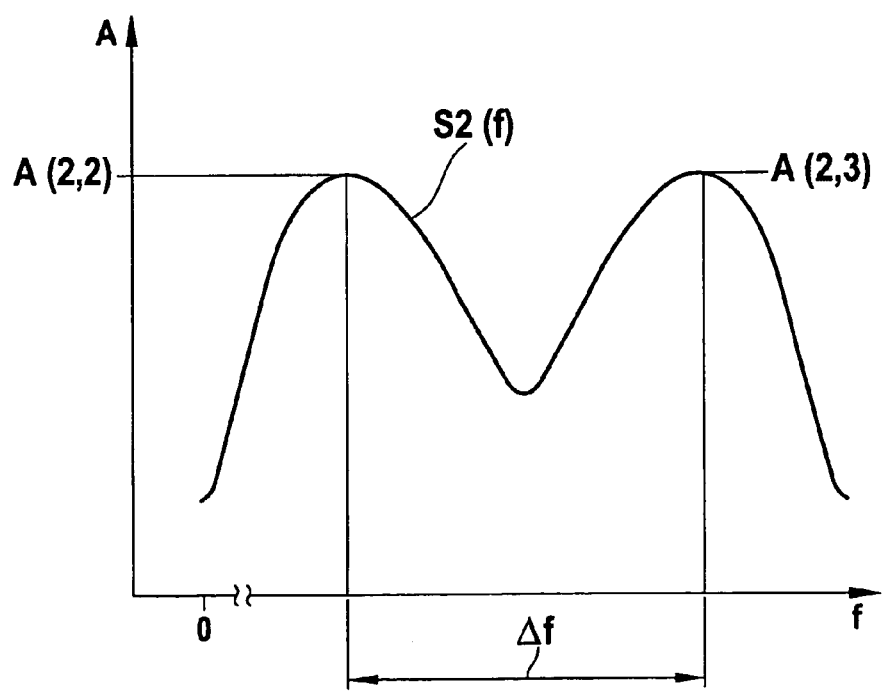
FIG. 6 shows a spectrum of a received signal for the situation shown in FIG. 5.

FIG. 6 show the associated spectrum $S2(f)$. This spectrum has two mutually clearly separated peaks having complex amplitudes A(2,2) and A(2,3) (only the magnitudes of the complex amplitudes are shown here). The peak at the lower frequency, having amplitude A(2,2), results from the signal that was transmitted by the antenna element of channel 2 at the frequency fe+$\Delta f$ and was then received again by the same antenna element (direct echo). The second peak, on the other hand, corresponds to the signal that was transmitted by the antenna element of channel 3 at frequency fe+$2\Delta f$ and was then received by the antenna element of channel 2 (cross echo). The frequency difference between the two peaks is thus Δf. The absolute values of amplitudes A(2,2) and A(2,3) are identical because the two radar lobes 14-2 and 14-2 in FIG. 5 are situated symmetrically with respect to object 40.

Figure 7:
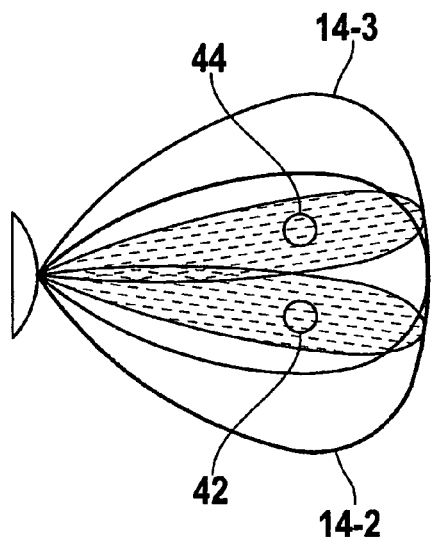
FIG. 7 shows a representation of two angularly offset objects in the overlapping region of two radar lobes.
Figure 8:
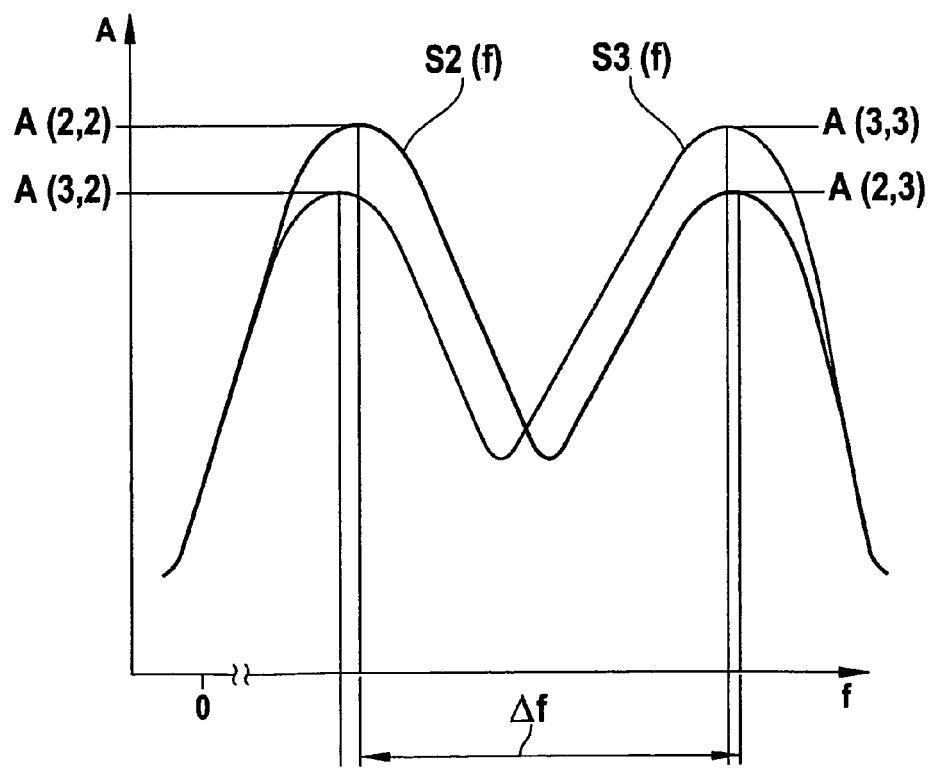
FIG. 8 shows spectrums of two signals for the situation shown in FIG. 7.

FIG. 7, by contrast, illustrates a situation in which two objects 42 and 44 or located that both have the same distance and the same relative speed, but different azimuth angles, that is, φ=+3° and φ=−3°. For radar lobes 14-2 and 14-3, the respective core regions, in which the intensity and the sensitivity are especially high, are shaded in FIG. 7. Object 42 lies in the core region of radar lobe 14-2, but outside of the core region of radar lobe 14-3. In the case of object 44, the reverse is true. FIG. 8 shows the associated spectrums S2(f) and S3(f). Both spectrums again have two peaks that are separated from each other by Δf. The amplitude of each peak is additively composed of two portions, which come from the two objects 42 and 44.

Object 42 is struck by the radar beam of channel 2 at maximum strength. The strength of this radar signals is given by curve 38-2 in FIG. 4, and is thus proportional to a variable B that indicates the apex value of this curve. Since this curve at the same time also indicates the sensitivity of the respective antenna element, the amplitude of the signal that was reflected on object 42 and received again by the antenna element of channel 2 is proportional to $B^2$.

Object 44, by contrast, is struck by radar lobe 14-2 only at a reduced strength. The signal strength and the sensitivity are given by a variable C in FIG. 4 such that the amplitude of this portion is equal to $C^2$. Thus (disregarding interference effects), for the total amplitude: A(2,2)=$B^2$+$C^2$. Thus, if C approximates 0.6 B, then one obtains: A(2,2)=1.36 $B^2$.

By analogous considerations, for the amplitude A(2,3) of the cross echo, one obtains: A(2,3)=2 BC=1.2 $B^2$.

For this reason, the amplitude A(2,3) in FIG. 8 is significantly smaller than the amplitude A(2,2). In the case of spectrum S3(f), the reverse is true.

Thus, the situations shown in FIGS. 5 and 7 may be distinguished from each other on the basis of the spectrums even though the two objects 42, 44 have the same distance and the same relative speed. If the frequencies transmitted by the antenna elements were identical, however, then the two peaks would coincide for example in spectrum S2(f), and it would not be possible to determine the associated amplitudes A(2,2) and A(2,3) separately.

Similar considerations, as were presented here for the absolute values of the amplitudes, also apply to the associated phases.

In order to utilize the information contained in the complex amplitudes for the cross echoes, the radar sensor shown in FIG. 1 has for each channel one analysis block 46 in which the amplitudes of the direct echoes and of all cross echoes are determined from the spectrums. Spectrum S1(f) has four peaks, for example, which are shifted with respect to one another by Δf and have the amplitudes A(1,1)-A(1,4). In this instance, A(1,1) corresponds to the direct echo in this channel, and A(1,2)-A(1,4) correspond to the cross echoes with the three remaining channels. Accordingly, the amplitudes A(2,1)-A(2,4), A(3,1)-A(3,4) and A(4,1)-A(4,4) are obtained from the spectrums S2(f), S3(f) and S4(f). Thus, for every located object, in total 16 complex amplitudes are available, which may be used to determine the azimuth angle φ of the object.

The azimuth angle may be determined, for example, on the basis of reference antenna diagrams, which are analogous to the set of antenna diagrams shown in FIG. 4 and from which it is possible to read off, for each azimuth angle φ, the associated absolute values of the amplitudes and phases of all direct echoes and of all cross echoes. For this purpose, the measured amplitude values are adapted to the antenna diagrams, for example, according to the method of the smallest distance squares or according to the maximum likelihood method, and the angle at which the best adaptation results is the sought azimuth angle φ of the object.

In the case of multiple objects which, like objects 42 and 44 in FIG. 7, cannot be separated on the basis of their different distances and/or relative speeds, the sought azimuth angles are those for which the best adaptation to the antenna diagrams results for the sums of the amplitude values of both objects.

As indicated in FIGS. 6 and 8, the frequency range, in which the spectrum of a located object exhibits non-vanishing values, may, depending on the relative speed, also extend beyond the frequency value zero into the negative frequency range, with the consequence that it is not possible to evaluate the spectrum fully or correctly. In the radar sensor shown here, however, this only applies to channel 1 since the spectrums of the other channels are shifted by at least Δf to positive frequencies. This improves the precision and reliability not only in determining the azimuth angle, but also in measuring the relative speed and the distance.

Figure 9:
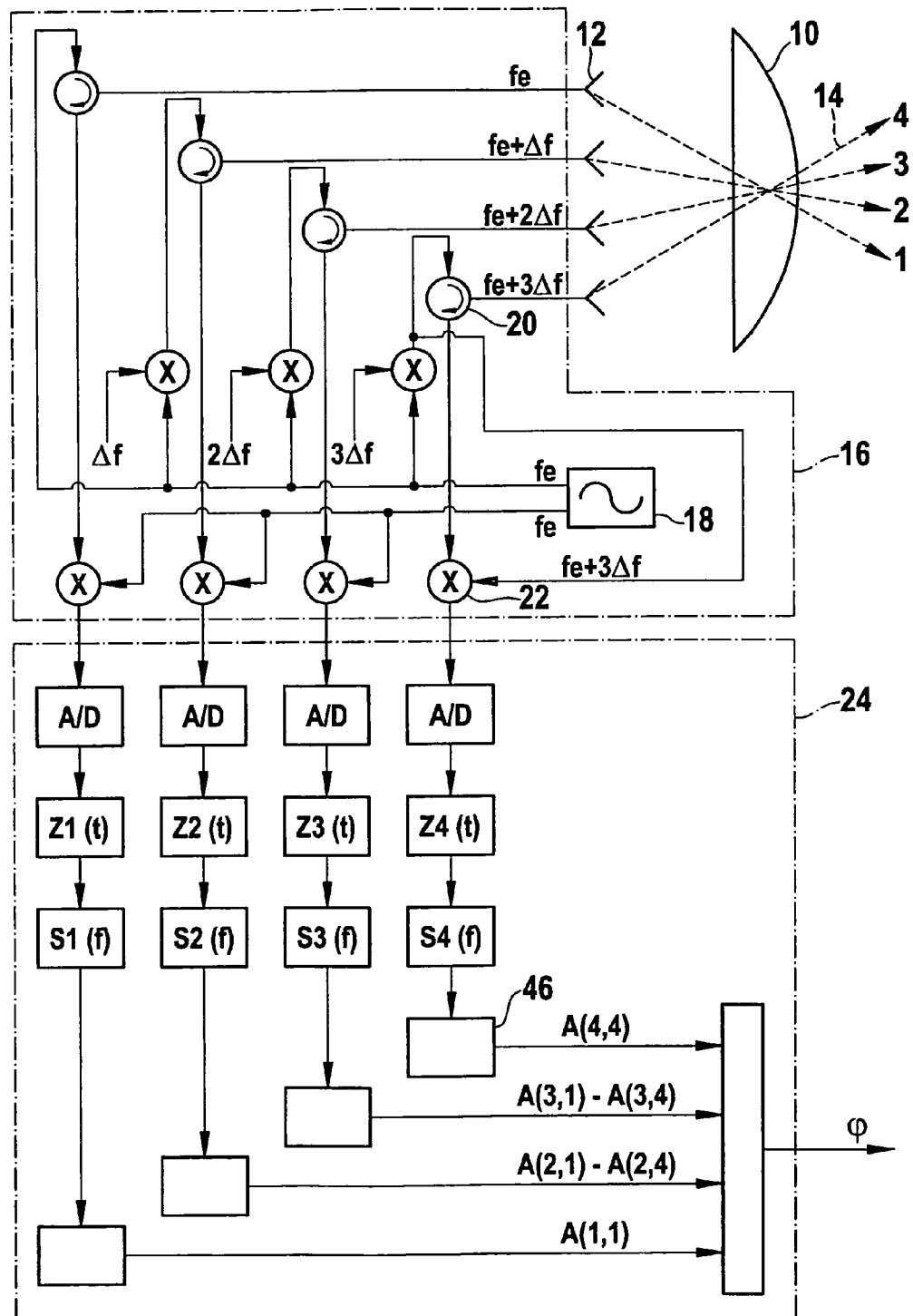
FIG. 9 shows a block diagram of a radar sensor according to a modified exemplary embodiment of the present invention.

Generally, not all 16 available complex amplitudes are needed for a sufficiently precise determination of the azimuth angle. In the case illustrated in FIGS. 7 and 8, for example, it suffices to evaluate spectrum S2(f) since spectrum S3(f) practically offers no additional information. FIG. 9 shows an example of how a simply constructed and cost-effective radar sensor may be produced along these lines.

In the transmitting and receiving element 16 of the radar sensor shown in FIG. 9, channels 2 and 3 have the same structure as in FIG. 1. In channel 4, however, mixer 22 does not receive the signal having the base frequency fe supplied by oscillator 18, but instead the signal having the frequency fe+3δf, which is tapped directly from the input of the associated circulator 20. Thus the frequencies transmitted by the four channels still differ from each other, but the intermediate frequency signal in channel 4 is again transformed back to the base band in which the intermediate frequency signal from channel 1 is also located. Consequently, the cross echoes from channels 1 through 3 are here in the frequency range that cannot be evaluated. Accordingly, only the amplitude A(4,4) corresponding to the direct echo is extracted in analysis block 46 of channel 4. In the first channel as well, only the amplitude A(1,1) corresponding to the direct echo is extracted. In channels 2 and 3, however, the cross echoes from channels 1 and 4 continue to be available and may thus be utilized for determining the azimuth angle φ of objects that are located in the two channels 3 and 4 or in the two channels 1 and 2.

The important advantage of this specific embodiment is that the analog/digital converters in channels 1 and 4 need to have only a low bandwidth since they do not have to process any frequencies that were increased by Δf or a multiple of Δf. Accordingly, the calculation of the spectrums by fast Fourier transform is simplified as well.

On the other hand, the exemplary embodiment as shown in FIG. 1 may also be modified in such a way that a frequency shifting stage 28 is provided in channel 1 as well, which shifts the frequency of oscillator 18 by Δf. The frequency shift in the remaining channels would then accordingly be 2Δf, 3Δf and 4ΔF. The advantage would be to reduce also in channel 1 the danger that parts of the spectrum lie in the frequency range that cannot be evaluated.

Figure 10:
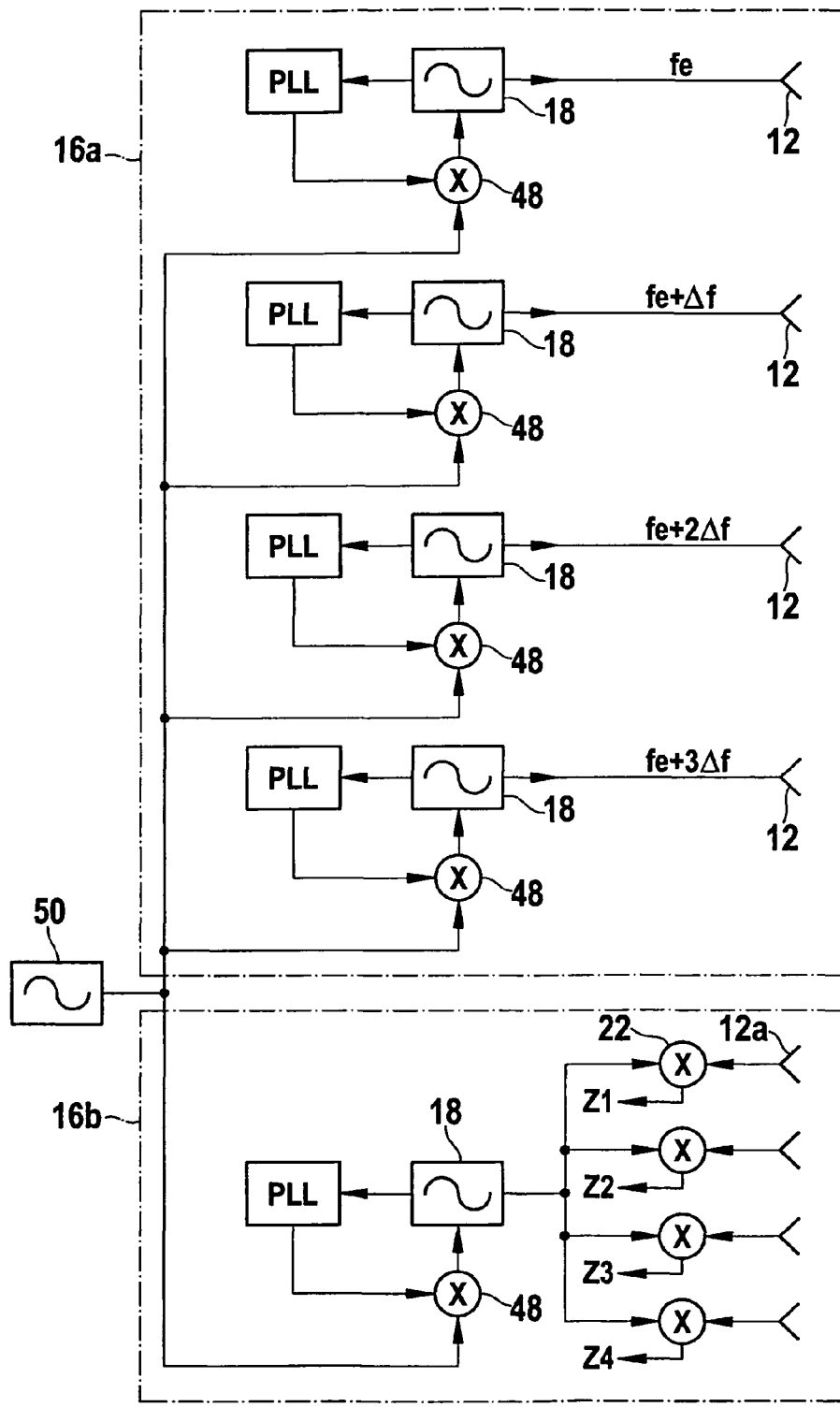
FIG. 10 shows an block diagram of a radar sensor according to another exemplary embodiment.

FIG. 10 finally shows another exemplary embodiment in which a separate oscillator 18 is provided for each antenna element 12. In the example shown, oscillator 18 of each channel is regulated in a phase-stable manner by a phase locked loop PLL. The feedback occurs via a mixer 48, which is controlled by a reference oscillator 50 (DRO; dielectric resonance oscillator) shared by all four channels. In this manner, oscillators 18 are synchronized with one another. The frequencies in all channels are modulated in the same way in ramp-shaped fashion, but the frequency offset is individually adjustable for each oscillator 18 via the PLL.

In this example, the radar sensor additionally has a transmitting element 16a and a separate receiving element 16b having its own antenna elements 12a. To generate intermediate frequency signals Z1-Z4, mixers 22 are supplied with the signal of another regulated oscillator 18 which like oscillators 18 of the transmitting element is also synchronized by reference oscillator 50. The evaluation device is not shown in FIG. 10 and has the same construction as in FIG. 1.

A construction having a combined transmitting and receiving element in analogy to FIG. 10 is also possible, in which the same antenna elements are used for transmitting and for receiving.

What is claimed is:

1. A radar sensor, comprising:
   multiple antenna elements adapted to transmit and receive radar signals;
   a transmitting and receiving element; and
   an evaluation device adapted to determine an azimuth angle of located objects based on a relationship between signals received from different ones of the antenna elements;
   wherein the transmitting and receiving element is adapted to supply to the antenna elements transmission signals in parallel, the frequencies of which being offset with respect to one another, and the evaluation device is adapted to differentiate between signals that were transmitted by different ones of antenna elements based on the frequency offset, and
   wherein the magnitude of the frequency offset for at least one of the antenna elements is at most equal to the smallest of the transmitting frequencies supplied to the multiple antenna elements.

2. The radar sensor as recited in claim 1, wherein the radar sensor is an FMCW radar.

3. The radar sensor as recited in claim 1, wherein the at least one of the antenna elements includes all of the antenna elements.

4. The radar sensor as recited in claim 1, wherein the transmitting and receiving element includes multiple oscillators for supplying the transmission signals and a separate oscillator is assigned to each transmitting antenna element.

5. The radar sensor as recited in claim 1, wherein the evaluation device is adapted to digitize received signals and includes analog/digital converters, which are respectively assigned to one of the receiving antenna elements and which differ in their bandwidth, and the evaluation device is adapted to perform the differentiation based on the frequency offset only for those digitized signals that were digitized at a bandwidth greater than the narrowest bandwidth.

6. The radar sensor as recited in claim 1, wherein the radar sensor is an FMCW radar, and wherein the at least one of the antenna elements includes all of the antenna elements.

7. The radar sensor as recited in claim 6, wherein the transmitting and receiving element includes multiple oscillators for supplying the transmission signals and a separate oscillator is assigned to each transmitting antenna element.

8. The radar sensor as recited in claim 7, wherein the evaluation device is adapted to digitize received signals and includes analog/digital converters, which are respectively assigned to one of the receiving antenna elements and which differ in their bandwidth, and the evaluation device is adapted to perform the differentiation based on the frequency offset only for those digitized signals that were digitized at a bandwidth greater than the narrowest bandwidth.

9. The radar sensor as recited in claim 6, wherein the evaluation device is adapted to digitize received signals and includes analog/digital converters, which are respectively assigned to one of the receiving antenna elements and which differ in their bandwidth, and the evaluation device is adapted to perform the differentiation based on the frequency offset only for those digitized signals that were digitized at a bandwidth greater than the narrowest bandwidth.

* * * * *